US009557512B2

(12) United States Patent
Toth et al.

(10) Patent No.: US 9,557,512 B2
(45) Date of Patent: Jan. 31, 2017

(54) HIGH PRESSURE SPLICE HOUSING

(71) Applicant: AFL Telecommunications LLC, Duncan, SC (US)

(72) Inventors: John Toth, Clermont, FL (US); Eddie Kimbrell, Dacula, GA (US); Ted Lichoulas, Simpsonville, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 14/780,010

(22) PCT Filed: Mar. 26, 2014

(86) PCT No.: PCT/US2014/031878
§ 371 (c)(1),
(2) Date: Sep. 25, 2015

(87) PCT Pub. No.: WO2014/160787
PCT Pub. Date: Oct. 2, 2014

(65) Prior Publication Data
US 2016/0054535 A1 Feb. 25, 2016

Related U.S. Application Data

(60) Provisional application No. 61/805,353, filed on Mar. 26, 2013, provisional application No. 61/805,359, filed on Mar. 26, 2013.

(51) Int. Cl.
G02B 6/00 (2006.01)
G02B 6/50 (2006.01)
G02B 6/44 (2006.01)

(52) U.S. Cl.
CPC ............ *G02B 6/506* (2013.01); *G02B 6/4427* (2013.01); *G02B 6/4428* (2013.01);
(Continued)

(58) Field of Classification Search
CPC ...... G02B 6/506; G02B 6/4427; G02B 6/4446
See application file for complete search history.

(56) References Cited

U.S. PATENT DOCUMENTS 4,708,427 A 11/1987 Ejiri et al.
4,733,935 A 3/1988 Gandy
(Continued)

FOREIGN PATENT DOCUMENTS

EP 0083101 A2 7/1983
GB 2274175 A 7/1994
GB 2300491 A 11/1996

OTHER PUBLICATIONS

International Search Report for PCT/US2014/031878 dated Aug. 12, 2014.
(Continued)

Primary Examiner — Sung Pak
(74) Attorney, Agent, or Firm — Dority & Manning, P.A.

(57) ABSTRACT

A pressure housing apparatus including a first cable termination shell, a housing connected to the first cable termination shell, a pressure vessel slide shell provided to the hollow housing, a cable termination assembly oriented within the housing, a plurality of pass through widows provided from the interior of the housing to the splice trays, and a plurality of circumferentially oriented splice trays provided to the cable termination assembly configured for receiving fiber tubes.

16 Claims, 15 Drawing Sheets

(52) U.S. Cl.
CPC ......... *G02B 6/4454* (2013.01); *G02B 6/4465* (2013.01); *G02B 6/4471* (2013.01); *G02B 6/4446* (2013.01)

(56) References Cited

U.S. PATENT DOCUMENTS

| | | |
|---|---|---|
| 5,873,750 A | 2/1999 | Cairns et al. |
| 6,752,397 B2 | 6/2004 | Kohli et al. |
| 6,796,821 B2 | 9/2004 | Cairns et al. |
| 7,278,789 B2 * | 10/2007 | Kordahi ............... G02B 6/4428 385/135 |
| 8,363,999 B2 | 1/2013 | Mertesdorf et al. |
| 2004/0160663 A1 | 8/2004 | DeVincentis et al. |
| 2010/0202748 A1 | 8/2010 | Pierce et al. |
| 2011/0280538 A1 | 11/2011 | Durrant et al. |
| 2012/0281955 A1 | 11/2012 | Hudson et al. |

OTHER PUBLICATIONS

Written Opinion for PCT/US2014/031878 dated Aug. 12, 2014.
European Search Report dated Jul. 27, 2015 for European Patent Application No. EP14773194.

* cited by examiner

HIGH PRESSURE SPLICE HOUSING

CROSS REFERENCE TO RELATED APPLICATION

This application is based upon and claims the benefit of priority from U.S. Provisional Application Nos. 61/805,353, filed Mar. 26, 2013, and 61/805,359, filed Mar. 26, 2013 in the United States Patent and Trademark Office, the disclosures of which are incorporated herein in their entirety by reference.

BACKGROUND

1. Field

The invention is related to a high pressure housing assembly, and more particularly to a high pressure housing assembly suitable for use in underwater environments.

2. Related Art

Fiber optic cables have become more prevalent in communications and sensing applications in subsea oil and gas, and military applications. As more optical fiber is used in subsea infrastructure, there is an increasing need for a cost effective, high reliability, space efficient pressure vessel to house both optical and electrical components.

One of the key challenges in subsea system design is to provide a one atmosphere hollow pressure vessel attached to transmission cables that can be used to house components needed in various subsea industries such as communications, defense, and offshore oil and gas markets with the ability to withstand the hydrostatic pressures of deep and ultra-deep sea environments. Designing this type of pressure vessel to be hermetically sealed and resistant to corrosion while making the pressure house capable of being re-entered if necessary has proved to be a significant design challenge.

In subsea communications and control systems, it is common practice to package or splice copper and/or fiber optic conductors in pressure vessels that are connected to a cable. One significant challenge has been to maintain the structural integrity of the pressure vessel housing and cable while keeping the overall weight as light as possible for assembly and deployment purposes. Many methods have been employed to solve these technical problems. These methods typically require separate mechanical parts or sub-assemblies that are bolted or welded together to form the complete pressure vessel assembly. This welded method does not allow re-entry into the pressure vessel if needed during the manufacturing, testing and handling prior to deployment. The bolted case and cover method requires a significant number of high strength fasteners and extra material around the fasteners to transfer the load into the housing components resulting in thick walled housings.

Some of the conventional technology includes:
1. All metal pressure housing with one or more bolted on end caps;
2. Pressure housings with end caps that are attached via internal screw threads;
3. Pressure housings with external slide shell configuration requiring internal axial load end-cap support structure;
4. All metal pressure housing vessel with welded case and cover type construction;
5. Two piece all metal "clam-shell" type construction;
6. Non-metallic pressure vessel housing; and
7. Hybrid pressure vessel construction using metallic and non-metallic construction components.

SUMMARY

Exemplary implementations of the present invention address the problems and/or disadvantages of the current technology described above. Although the present invention is not required to overcome all of the disadvantages described above, the exemplary implementations of the present invention may address the above disadvantages, and further disadvantages not described above, or may not overcome any of the problems listed above while still providing enhancement to the present art.

A first embodiment of the present invention features a high pressure apparatus, in an inline configuration, assembled from a first cable termination shell, with a housing connected to the first cable termination shell which interfaces with at least one circumferentially oriented splice tray configured for receiving a plurality of fiber tubes and securing and terminating the tubes. The splice trays are oriented circumferentially around the long axis of the housing. The housing is also provided with a cable termination assembly. The cable termination assembly secures a cable, which enters the housing through the center of an end cap. The housing is provided with a pressure vessel slide shell to protect the internal components from water or pressure damage.

A further aspect of the exemplary embodiment is to provide a second cable termination shell to the pressure housing apparatus.

A further aspect of the exemplary embodiment is to provide a bolted flange to the first or second cable termination shell.

A further aspect of the exemplary embodiment is to provide a pulling mechanism on the housing.

A further aspect of the exemplary embodiment is to provide a plurality of circumferentially oriented splice trays to the housing interior.

A further aspect of the exemplary embodiment is to provide at least one pass through window through the splice tray.

A further aspect of the exemplary embodiment further comprises a cylindrical pressure vessel slide shell.

A further aspect of the exemplary embodiment further comprises a polyurethane, polyethylene, or other polymer type overmold provided to the exterior of the pressure vessel slide shell.

Further aspects of the exemplary embodiment of the housing interior includes: an outer armored wedge positioned within the cable termination shell; an inner armored wedge; an inner layer of fiber tubes; an outer layer of fiber tubes; an inner jacket seal; a plurality of o-rings; a first layer cable jacket grip; and a plurality of circumferentially oriented splice trays.

A further aspect of the exemplary embodiment is to seal the plurality of fiber tubes with Morrison seals.

A further aspect of the exemplary embodiment is to seal the plurality of fiber tubes with boot seals.

A further aspect of the exemplary embodiment is to seal the plurality of fiber tubes with metal-to-metal swage fittings.

A further aspect of the exemplary embodiment is to seal the plurality of fiber tubes with a plurality of o-rings.

A further aspect of the exemplary embodiment is to provide a threaded collar to the first or second cable termination shell.

A further aspect of the exemplary embodiment is to provide the housing with a standoff spacer.

A further aspect of the exemplary embodiment is to provide the housing with a plurality of o-rings.

A second exemplary embodiment is to provide the housing with a bolted flange and a pulling mechanism.

A further aspect of the second exemplary embodiment is wherein the pulling mechanism is configured as an eyelet.

DETAILED DESCRIPTION

The following detailed description is provided to assist the reader in gaining a comprehensive understanding of the methods, apparatuses and/or systems described herein. Various changes, modifications, and equivalents of the systems, apparatuses described herein will suggest themselves to those of ordinary skill in the art. Descriptions of well-known functions and structures are omitted to enhance clarity and conciseness.

Figure 1:
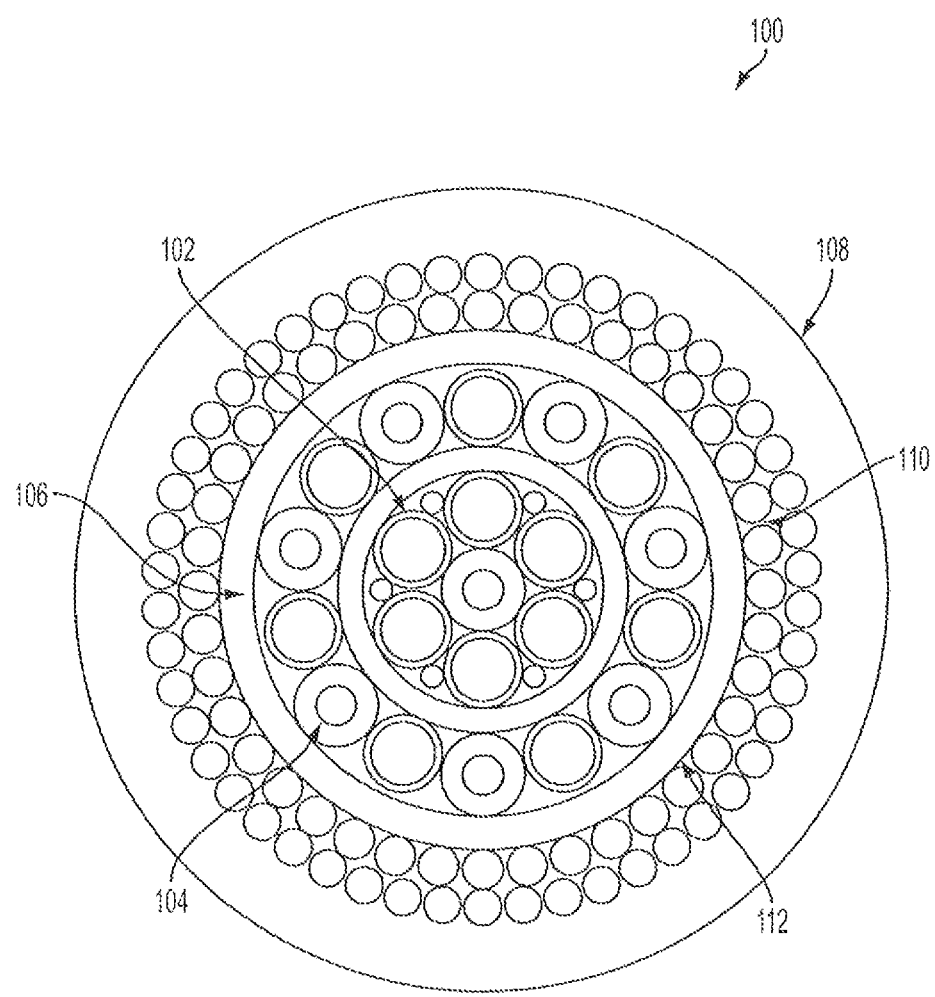
FIG. 1 is a cross section view of a representative ocean bottom (subsea) cable.

FIG. 1 shows a cross section view of the first exemplary embodiment of an ocean bottom (subsea) cable (100). There is a wide variation in ocean bottom (subsea) cable design. These cables, however, share a number of common features. This exemplary embodiment of an ocean bottom cable (100) includes an inner cable (102) comprising galvanized improved plow steel (GIPS) wires and high-density polyethylene (HDPE) jacketed SSTL fiber tubes. Surrounding the inner cable (102) is a secondary layer (104) of HDPE jacketed SSTL fiber tubes and GIPS Wires which is in turn sheathed by an inner jacket (106) made from HDPE. The inner jacket (106) provides secondary protection for the conductors (electrical or fiber optic cable) comprising the inner core of the ocean bottom (subsea) cable. The inner jacket (106) serves two functions, it provides a secondary barrier against seawater, and it protects the conductors within the inner jacket (102) from being deformed or kinked by the outer armor wires (110) when the cable is under tensile load. The inner jacket (106) is surrounded by an outer armor layer (110) comprising GIPS wire to provide primary mechanical strength elements to the cable to protect against various forms of stress including tensile, compressive, twist and crush loading. Surrounding the outer armor layer (110) is the outer cable sheath (108). In this embodiment, the outer cable sheath (108) is thermoplastic polyurethane (TPU) or Hytrel®.

Figure 2:
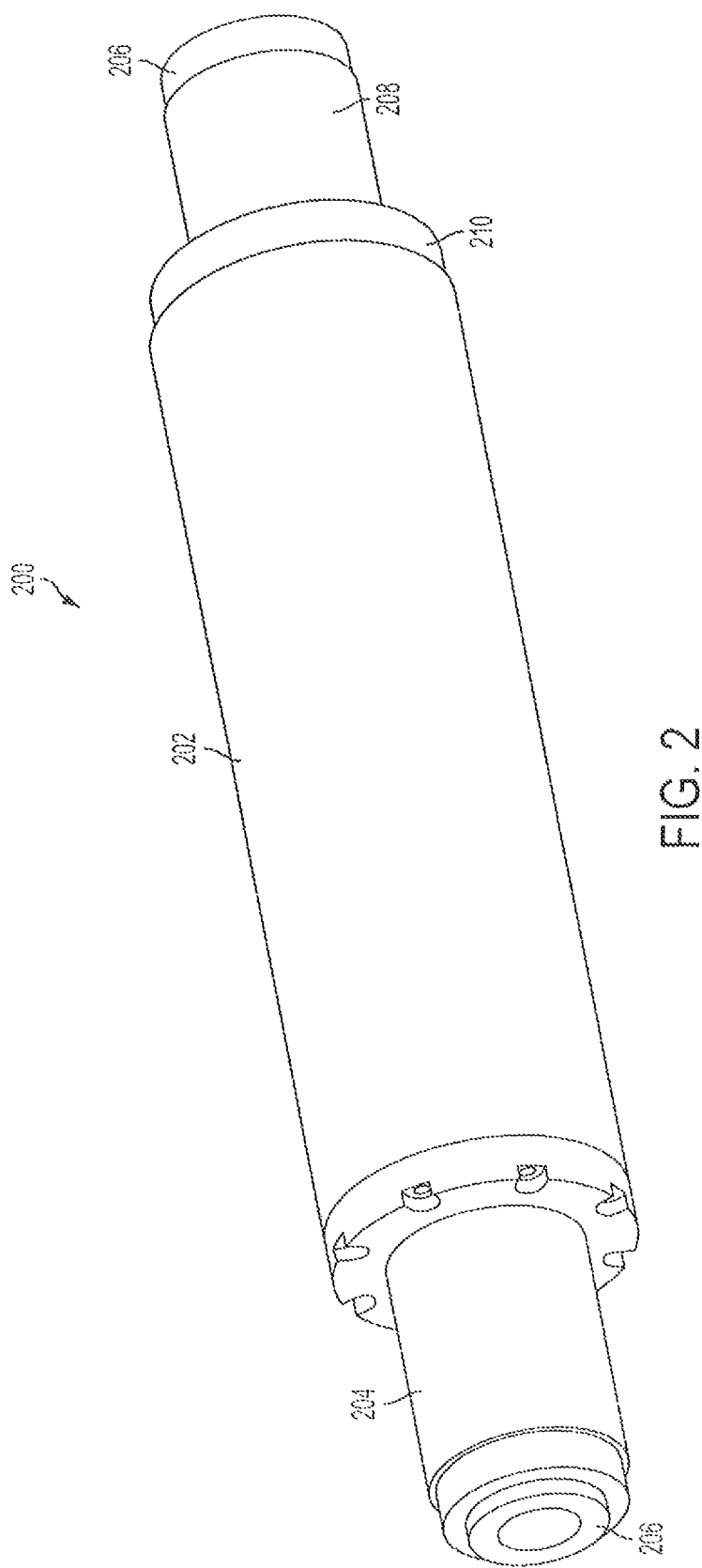
FIG. 2 is the first exemplary embodiment of a high pressure housing wherein the pressure vessel slide shell is not overmolded and the cable attachment is not shown.

FIG. 2 shows an isometric view of the first exemplary embodiment of an assembled high pressure housing in an inline configuration (200). The overmolding, cable attachment, cable termination and polyurethane, polyethylene or polymer type overmold is not shown. Some of the major components are identified and the pressure vessel slide shell (202) are shown having the cable termination shell with bolted flange (204) and cable termination shell without flange (208) at either ends. The cable termination shell with flange (204) and the cable termination shell without flange (208) can be sized to fit ANSI flange sizes common to most subsea interconnect applications and may include a threaded collar (206). An overmold (not shown) provides several functions including, strain relief for the cable during handling/deployment, a seawater pressure barrier, a seawater sealing barrier, and a seawater corrosion barrier. A locking ring (210) may be provided between the cable termination ends and the pressure vessel slide shell (202).

Figure 3:
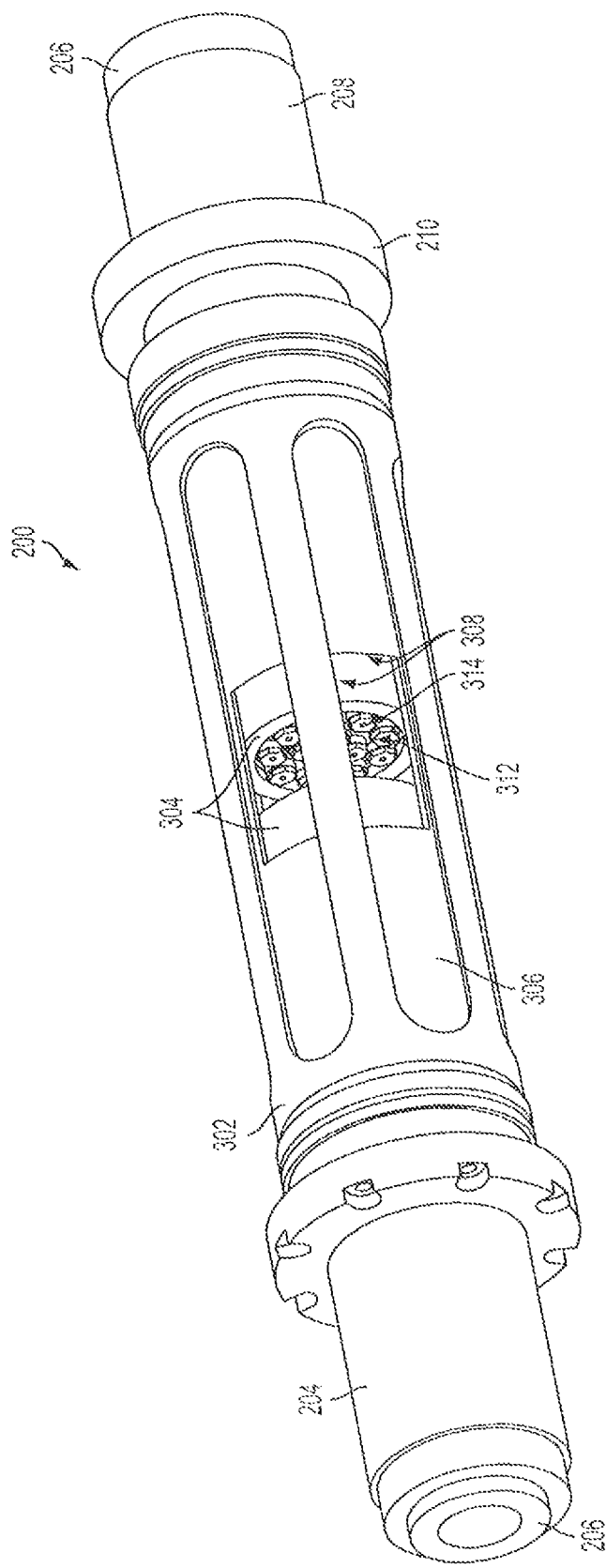
FIG. 3 shows an interior view of the first exemplary embodiment of the interior view of the high pressure housing assembly.

FIG. 3 shows an interior view of the first exemplary embodiment of the high pressure housing (200). The figure shows the interior stand-off shell (302) with integral circumferential splice trays with the pressure vessel slide shell (202) removed to show the interior configuration. The figure shows two cable termination assemblies (304) held in position during assembly using the interior stand-off shell (302) configured with six circumferentially oriented splice trays (306). The cable termination assembly (304) holds a plurality of fiber tubes (312) and the fiber tubes may be terminated with a swage lock (314) as shown, or alternative methods of sealing, or a combination of swage lock (314) and other methods of sealing. The standoff shell (302) is configured with six pass through windows (308) positioned radially around the standoff splice housing body providing fibers exiting the cable termination assembly (304) a route to the six circumferentially oriented spice trays (306).

Figure 4:
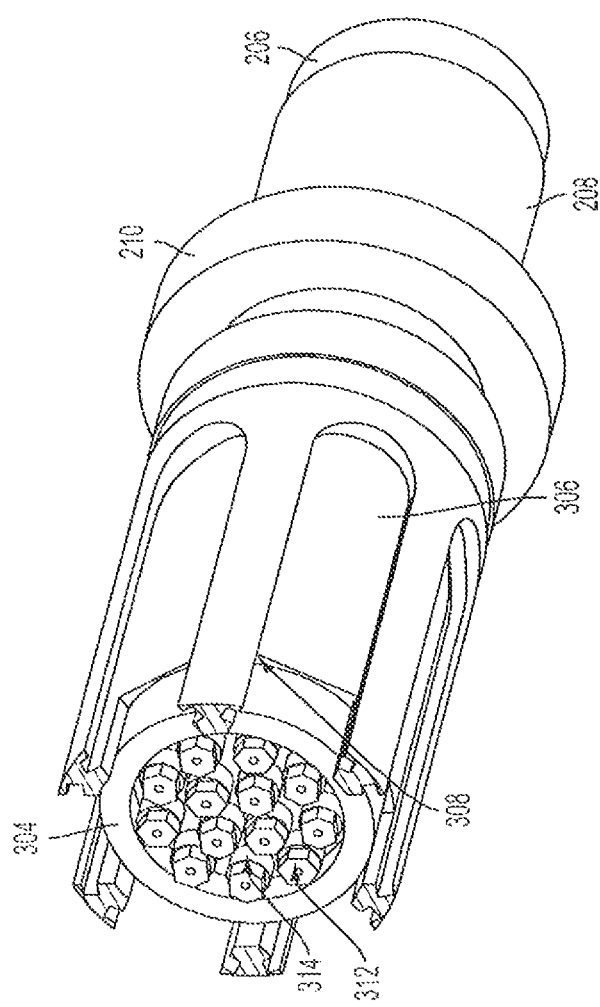
FIG. 4 shows an interior section view of the first exemplary embodiment of the high pressure housing wherein the various components within the pressure vessel interior are shown.

FIG. 4 shows a cross-sectional view of the first exemplary embodiment of the high pressure housing. The cable termination assembly (304) contains a plurality of tubes each containing fiber (312), and each tube is sealed using a swage lock (314). The tubes can contain a plurality of fibers, including, but not limited to fiber counts of 12, 16, 24, 32 and 36. The length of the pass through windows (308) and the distances between the ends of the two cable termination assemblies (304) is based on the length needed to route the fiber into the circumferentially oriented splice trays (306) without creating a fiber macrobend.

Figure 5:
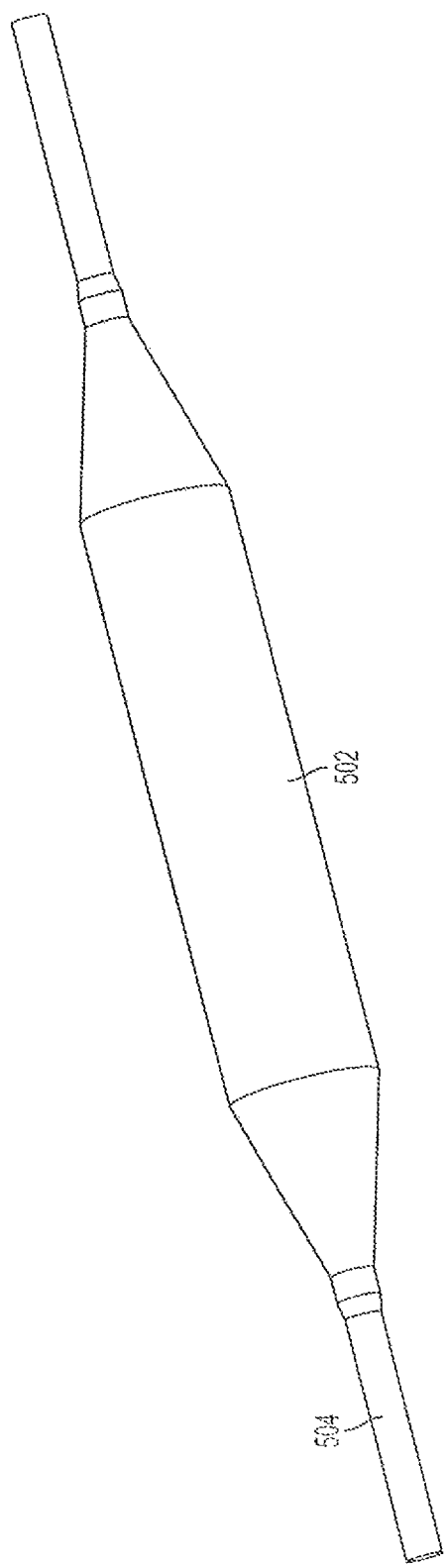
FIG. 5 shows the first exemplary embodiment of the high pressure housing with a polyurethane overmold.

FIG. 5 shows the first exemplary embodiment of an overmolded high pressure housing showing a cable (504) passing through a polyurethane, polyethylene or polymer type overmold (502). In this exemplary embodiment the molded length is 1.25 meters, and the molded width is 0.17 meters.

Figure 6:
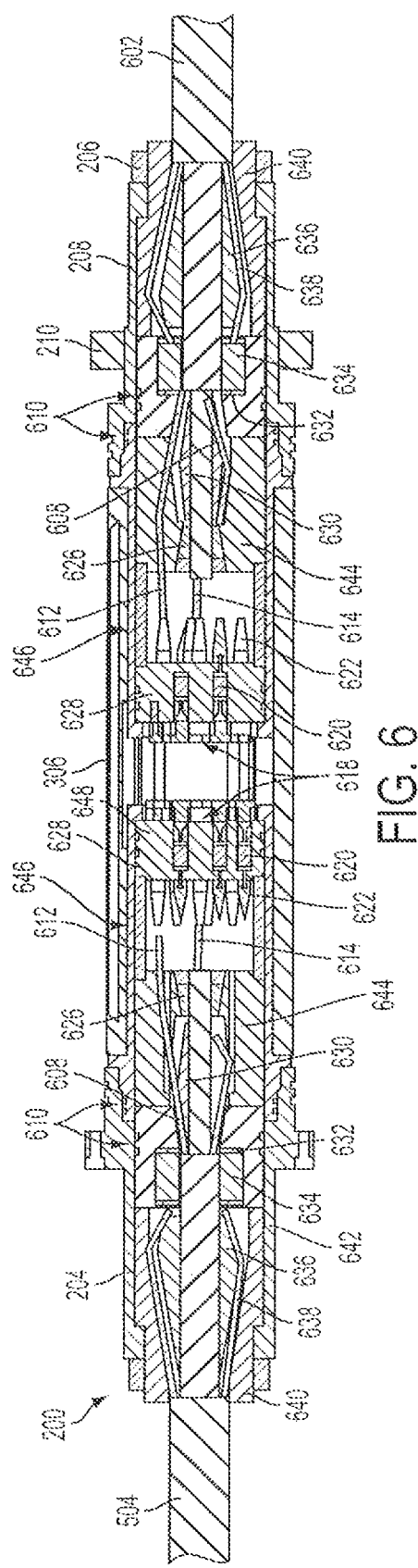
FIG. 6 shows a cross section of the first exemplary embodiment of the high pressure housing.

FIG. 6 shows a cross section of the first exemplary embodiment of the high pressure housing (200) with one end having a cable termination with bolted flange (204), the other end having a cable termination without flange (208). In this assembled view, the cable (504) extends through the outer armor termination body (640) of the cable termination shell with bolted flange (204). The cable (504) is provided structural support within the cable termination shell with flange (204) by first and second outer armor wires (638) and an outer armored wedge (636). The outer armored wedge (636) secures the first and second layer armor wires (638) with the inner layer armor wires (608) passing through the center of the outer armor wedge (636). The cable (504) comprises the inner layer fiber tubes (614) which are sheathed by an inner armor wedge (630). The inner armored wedge (630) is surrounded by the outer layer fiber tubes (612) which are themselves sheathed by the outer armor wedge (636). The inner armored wedge (630) holds the cable tube bundle, including the first and second outer armor wires (638) and the fiber tubes, keeping the tube bundle rigid to prevent movement under tension. Between the outer armored wedge (636) and the cable exterior are the first and second outer armor wires (638) providing structural support. An inner jacket seal (634) prevents water or moisture from passing through from the cable termination shell with flange (204) into the inner chamber of the high pressure housing where the outer layer fiber tubes (612) and the inner layer fiber tubes (614) are sealed before being routed to the splice trays (306). A high pressure seal housing (642) with the bolted flange termination (204) is further protected from water by a series of o-rings (610) and the inner jacket seal (634) is positioned between two spacer plates (632) which prevent extrusion of the seal when exposed to high pressure. The interior components of the high pressure housing are also secured by an inner termination shell (646) which surrounds the interior termination body (644), sealing components and fiber tubes contained therein. The inner jacket seal (634) is a pressure tight seal that stops water leakage past the outer armored wedge (636) along the outer surface of cable HDPE belt. In this figure, the outer layer fiber tubes (612) and inner layer fiber tubes (614) are sealed using Morrison seals (620), metal-to-metal swage seals (618) or boot seals (622), or other suitable seals, and then guided into the respective six circumferentially oriented splice trays (306). The pressure vessel slide shell is not shown.

Figure 7:
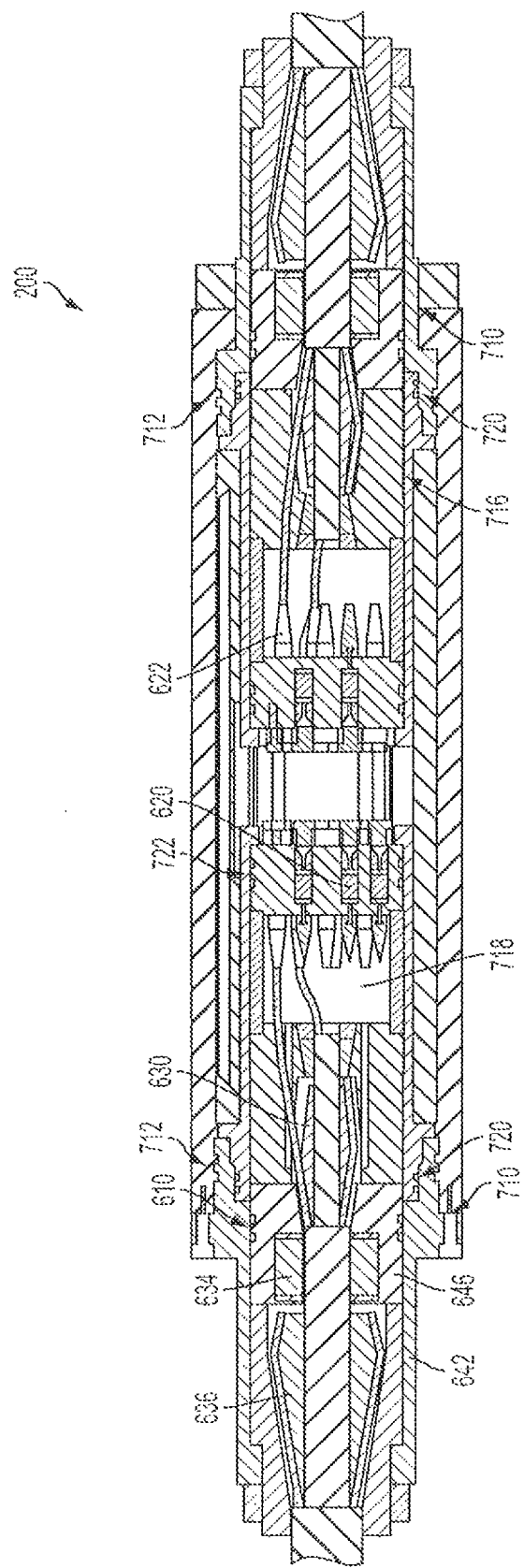
FIG. 7 shows a cross section of the first exemplary embodiment of the terminal cable armor and fiber tube paths of the high pressure housing.

FIG. 7 shows a cross section of the first exemplary embodiment of the high pressure housing (200) depicting the various leak paths that are mitigated by the high pressure housing design. In this figure, the polyurethane, polyethylene or polymer type overmold is not shown. The figure shows redundant leak path protection for all leak paths. In the first exemplary embodiment, a first leak path occurs when a cable jacket cut or breach occurs thus allowing water to bypass the outer urethane overmold creating a short term impedance by the cable water block compound. The cable block compound is configured to minimize the flow of water within the cable in the event of a tear or breach in the cable sheath, it also reduces the corrosion rate of the cable. To mitigate the first leak path, the high pressure housing is configured such that if water wicks past the armor termination wedge (636) it is blocked from reaching the outer tube layer by the secondary cable jacket Morrison seal (634) and secondary seal housing dual o-rings (610). A second leak path occurs wherein delamination or inadvertent damage occurs to the outer urethane overmold allowing water to reach the housing and end cap interface (710). To mitigate the second path leak, the high pressure housing is configured such that water is blocked from entering the termination housing by dual o-rings (712). A third leak path occurs where concurrent or subsequent outer and inner cable jacket failures, or secondary cable jacket Morrison seal (634) failures precede a first leak path flooding the cable core. To mitigate the third leak path, where water wicks past the inner armor termination wedge (630) and around the armor termination housing (716) flooding the spacer (718), water is thus prevented from entering the termination housing by the dual o-ring (720), dual o-ring (722), boot seal (622) metal-to-metal swage seal (618), and swage seal o-ring. A fourth leak path occurs wherein long term failure of all cable sealing layers or inadvertent cable damage failure described in the third leak path leads to long-term flooding of all cable layers and the stand-off spacer (718). To mitigate the fourth leak path, a series of redundant individual tube seals including boot seals (622), metal-to-metal swage seals (618), swage seal o-ring, and Morrison seals (620) are provided on each fiber tube such that flooding within the fiber tubes is prevented.

Figure 8:
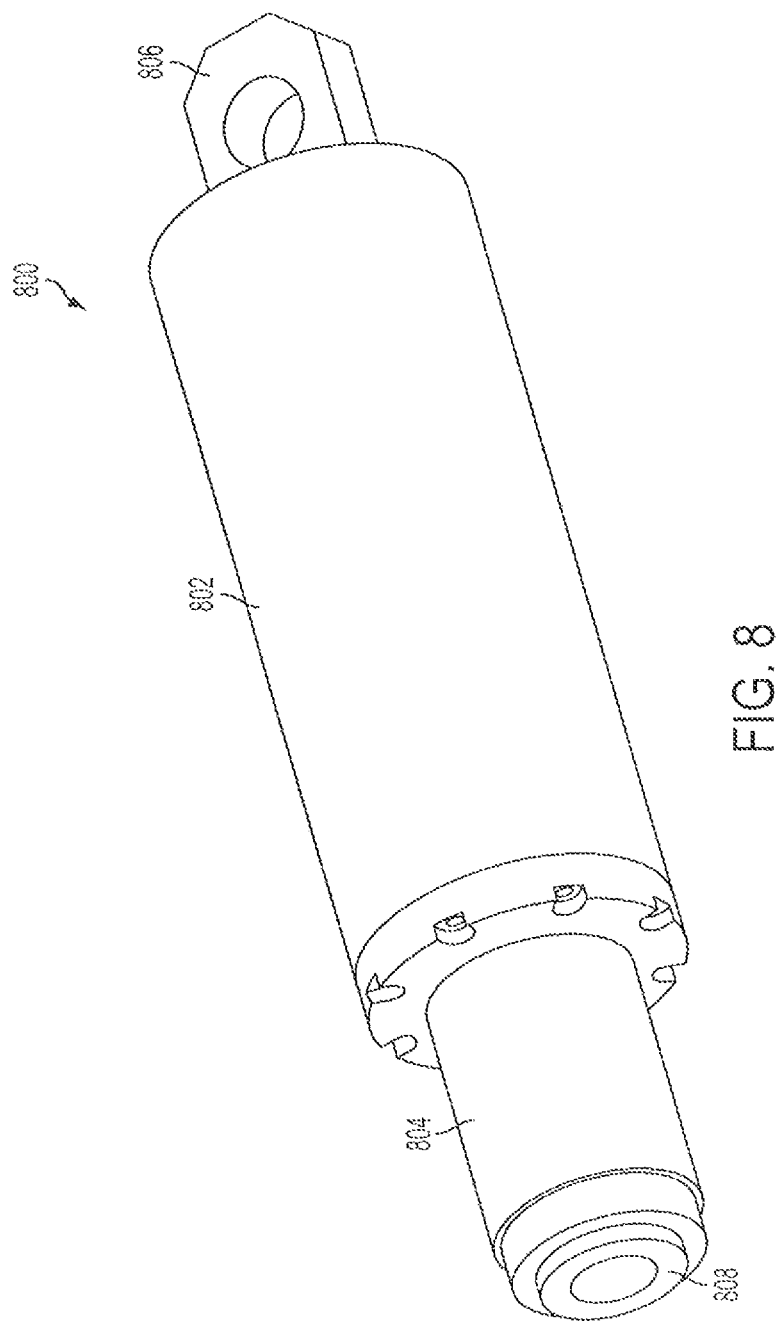
FIG. 8 is a second exemplary embodiment of the high pressure housing in loopback configuration, wherein the pressure vessel slide shell is not overmolded and the cable attachment is not shown.

FIG. 8 shows an isometric view of a second exemplary embodiment of an assembled high pressure housing (800) in a loopback splice configuration. The cable termination and polyurethane, polyethylene or polymer type overmold is not shown. Some of the major components are identified where the pressure vessel slide shell (802) is shown connected to the cable termination shell with bolted flange (804) and configured with a pulling mechanism (806). The cable termination shell with flange (804) can be sized to fit ANSI flange sizes common to most subsea interconnect application and may include a threaded collar (808). An overmold (not shown) provides several functions, including strain relief for cable during handling/deployment, a seawater pressure barrier, a seawater sealing barrier, and a seawater corrosion barrier. The pulling mechanism (806) allows for increased deployment flexibility.

Figure 9:
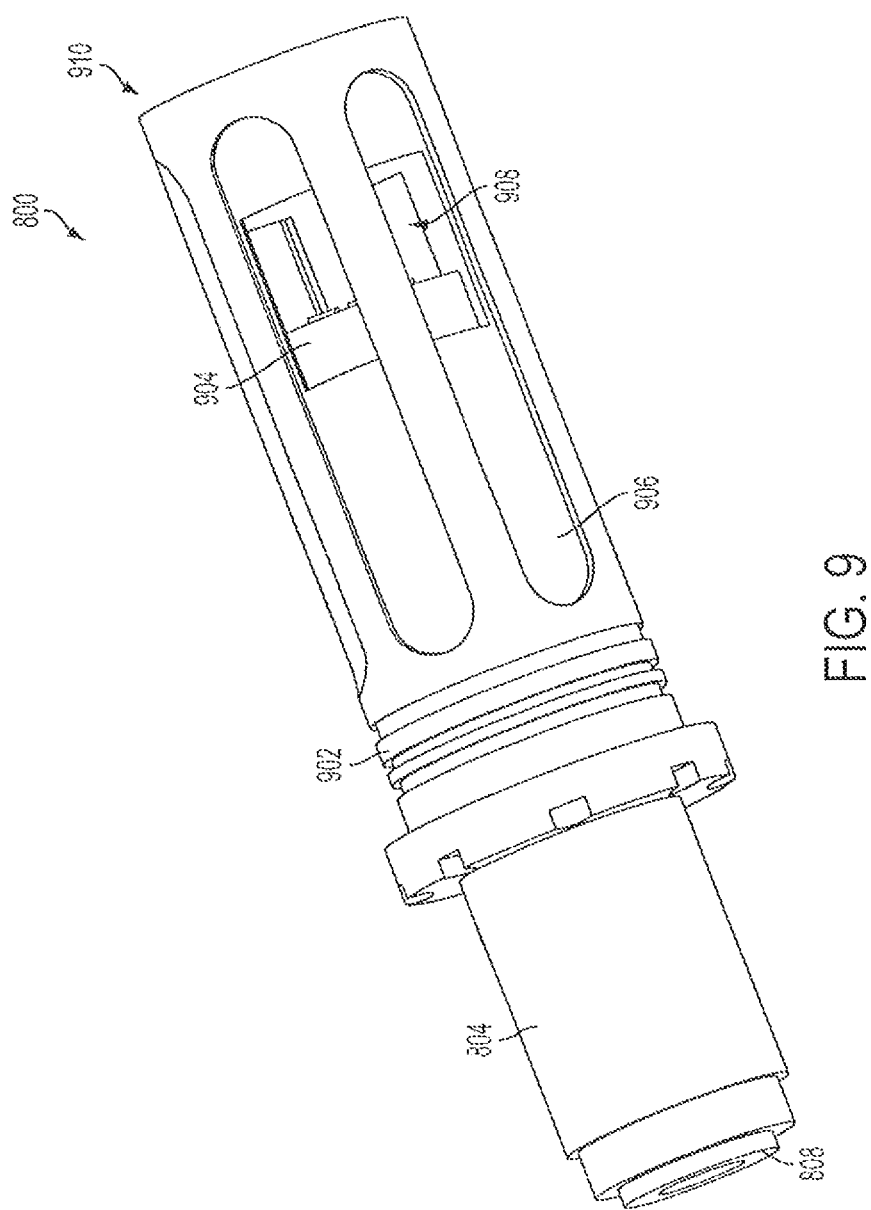
FIG. 9 shows an interior view of the second exemplary embodiment of the high pressure housing in loopback configuration.

FIG. 9 shows an interior view of the second exemplary embodiment of a high pressure housing (800) in a loopback splice configuration with the pressure vessel slide shell (802) removed to show the interior configuration. The figure shows the cable termination assembly (904) installed in an interior standoff shell (910) shown with six integral circumferentially oriented splice trays (906). The cable termination assembly (904) provides sealed passage for the fiber tubes which may be terminated and sealed with a swage lock or alternative methods of sealing. The interior standoff shell (910) is configured with six pass through windows (908) positioned radially around the standoff shell (910) in line with the splice trays (906) in order to allow fibers exiting the cable termination assembly (904) to route to the six circumferentially oriented spice trays (906).

Figure 10:
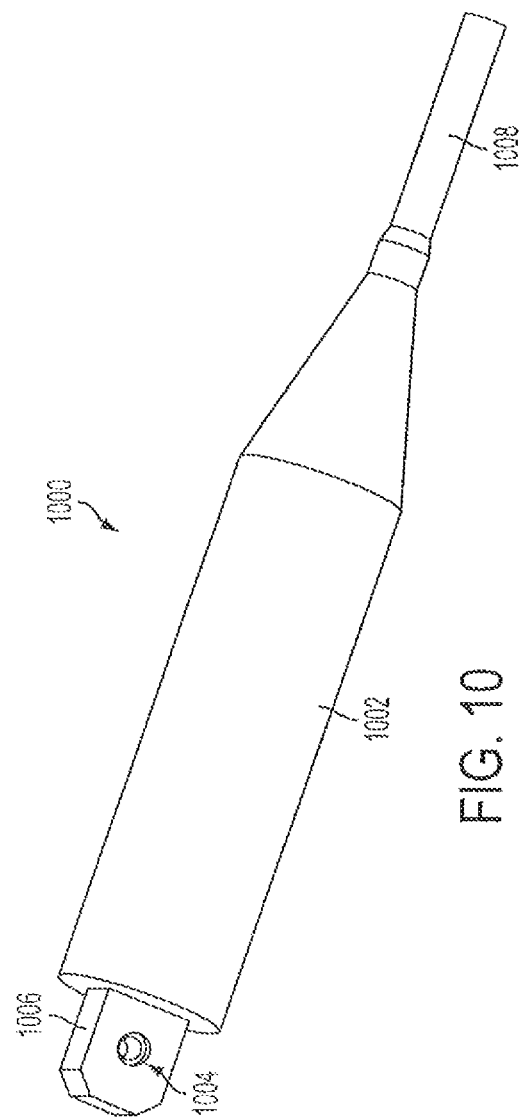
FIG. 10 shows the second exemplary embodiment of the high pressure housing in loopback configuration with overmold.

FIG. 10 shows the second exemplary embodiment of an overmolded high pressure housing (1000) in a loopback splice configuration. In the second exemplary embodiment the molded length is 0.95 meters, and the molded width is 0.17 meters. The second exemplary embodiment includes a polyurethane overmold (1002), an isolated bushing (1004) with pulling mechanism (1006) and cable (1008).

Figure 11:
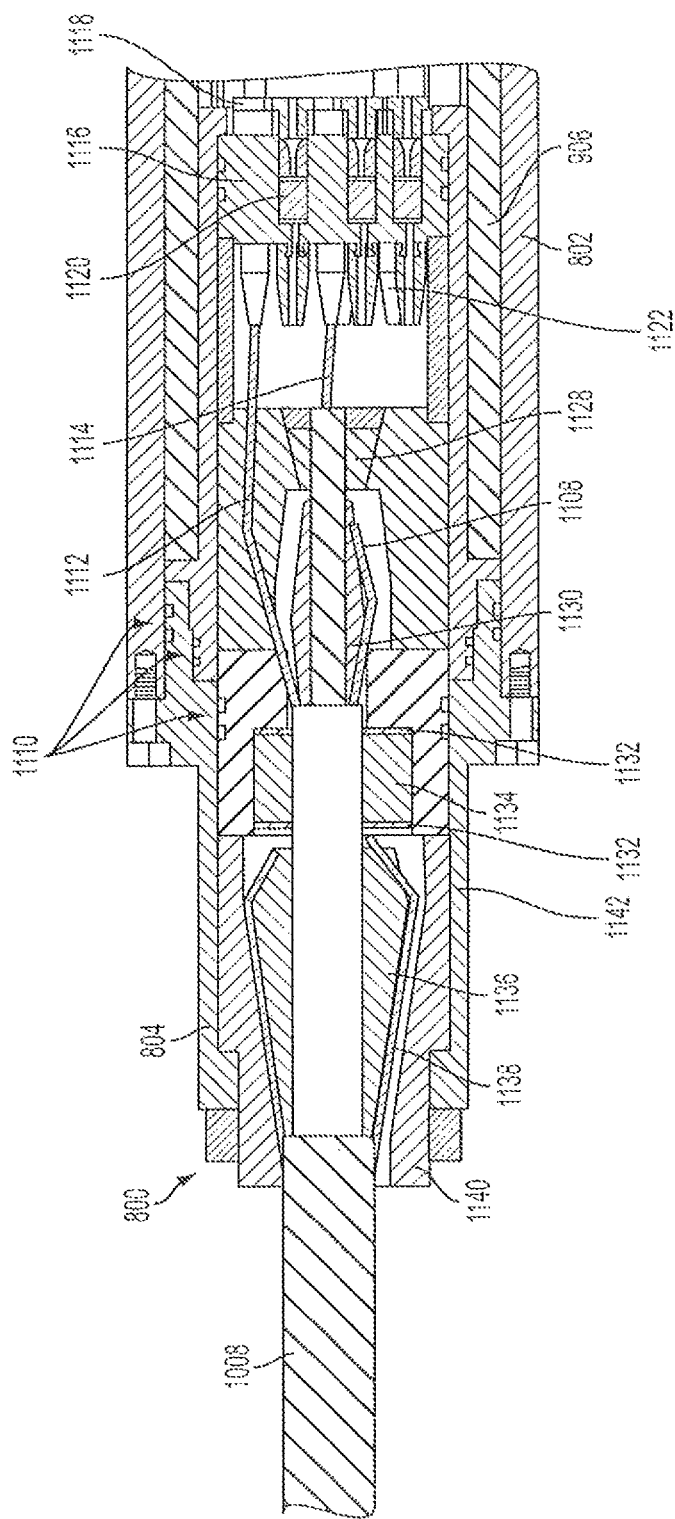
FIG. 11 shows a cross sectional view of the second exemplary embodiment of the high pressure housing in loopback configuration wherein the various components within the pressure vessel interior are shown.

FIG. 11 shows a cross section of the second exemplary embodiment of the high pressure housing (800) in a loopback splice configuration. In this assembled view, the pressure vessel slide shell (802) is shown wherein the cable (1008) extends through the outer armor termination body (1140) located within the cable termination shell with flange (804). The cable (1008) is provided structural support within the cable termination shell with flange (804) by the first and second outer armor wires (1138) and the outer armored wedge (1136). The cable comprises the inner layer fiber tubes (1114) which pass through an inner armor wedge (1130). The inner armor wedge (1130) is surrounded by the outer layer fiber tubes (1112), which are themselves sheathed by the outer armor wedge (1136). Further structural support is provided to the fiber tubes by the inner armor wires (1108). Between the outer armored wedge (1136) and the cable exterior are the first and second outer armor wires (1138) providing structural support. The inner armor wedge (1130) secures the cable core including the inner armor wires and fiber tubes keeping these components rigid to prevent independent movement under tension. The inner jacket seal (1134) prevents water or moisture from bypassing the cable termination shell with flange (804) into the inner chamber of the high pressure housing where the outer layer fiber tubes (1112) and the inner layer fiber tubes (1114) are sealed. The inner jacket seal (1134) is a pressure tight seal that also stops water flow from the outer armor wedge (1136) along the outer surface of the cable HDPE belt into the cable interior structure. The high pressure housing in loopback configuration termination housing (1142) and flange portion (1106) is further protected from water by a series of o-rings (1110). The inner jacket seal (1134) is positioned between two spacer plates (1132) which prevent the seal from extruding under high pressure. In this figure, the outer layer fiber tubes (1112) and inner layer fiber tubes (1114) are sealed using Morrison seals (1120), metal-to-metal swage seals (1118) and boot seals (1122), or other suitable seals, and then guided into the six circumferentially oriented respective splice trays (906).

Figure 12:
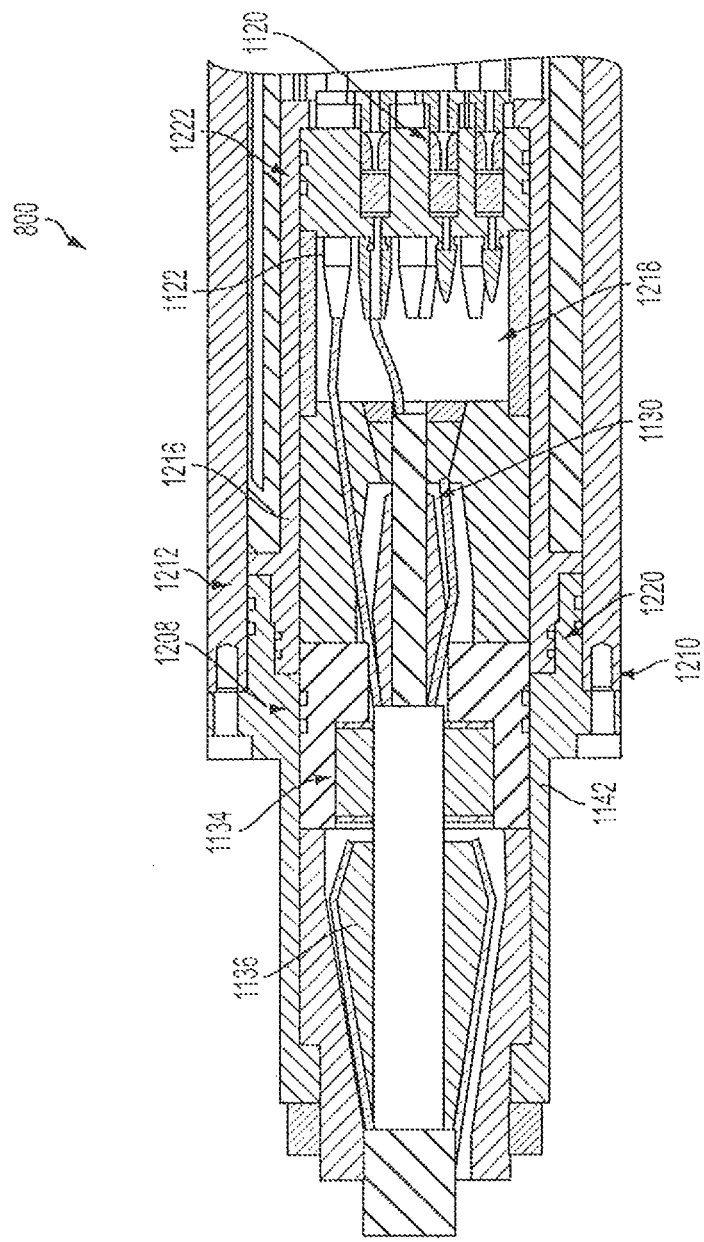
FIG. 12 shows a cross-sectional view of the second exemplary embodiment of the high pressure housing in loopback configuration.

FIG. 12 shows a cross section of the second exemplary embodiment of the high pressure housing in a loopback splice configuration (800) and a corresponding leak path analysis. In this figure, the high pressure housing in loopback configuration excludes the polyurethane, polyethylene or polymer type overmold. The figure shows redundant leak path protection for all leak paths. In the figure, a first leak path occurs when a cable jacket cut or breach occurs thus allowing water to bypass the outer urethane overmold and encounter a short term impedance by the cable-water block compound. The purpose of the cable water block compound is to minimize flow of water within the cable in the event of a sheath breach. This has a secondary benefit of reducing the corrosion rate. To mitigate the first leak path, the high pressure housing is configured such that water wicks past the armor termination wedge (1136) and is blocked from reaching the outer tube layer by the secondary cable jacket inner jacket seal (1134). Water wicking past the armor termination wedge is further blocked from bypassing inner cable jacket seal housing (1142) by dual o-rings (1208). A second leak path occurs wherein delamination or inadvertent damage occurs to the outer urethane overmold allowing water to reach the housing and end cap interface (1220). To mitigate the second path leak, the high pressure housing in loopback configuration is configured such that water is blocked from entering the termination housing by dual o-ring seals (1212). A third leak path occurs where concurrent or subsequent outer and inner cable jacket failures, or Morrison seal (1134) failures proceed a first leak path. To mitigate the third leak path, water wicks past the armor termination wedge (1130) and past the inner cable jacket Morrison seal (1134) flooding the standoff spacer area (1218). Water is thus prevented from entering the termination housing by the dual o-ring (1222) and boot seal (1122). A fourth leak path occurs wherein long term failure of all cable sealing layers or inadvertent cable damage failure described in the third leak path leafs to long-term flooding of all cable layers and the stand-off spacer area (1218). To mitigate the fourth leak path, a series of redundant individual tube seals including boot seals (1122), metal-to-metal swage (1118), and Morrison seals (1120), or other suitable seals, are provided on each fiber such that tube-to-tube flooding within the fiber tubes is prevented.

Figure 13:
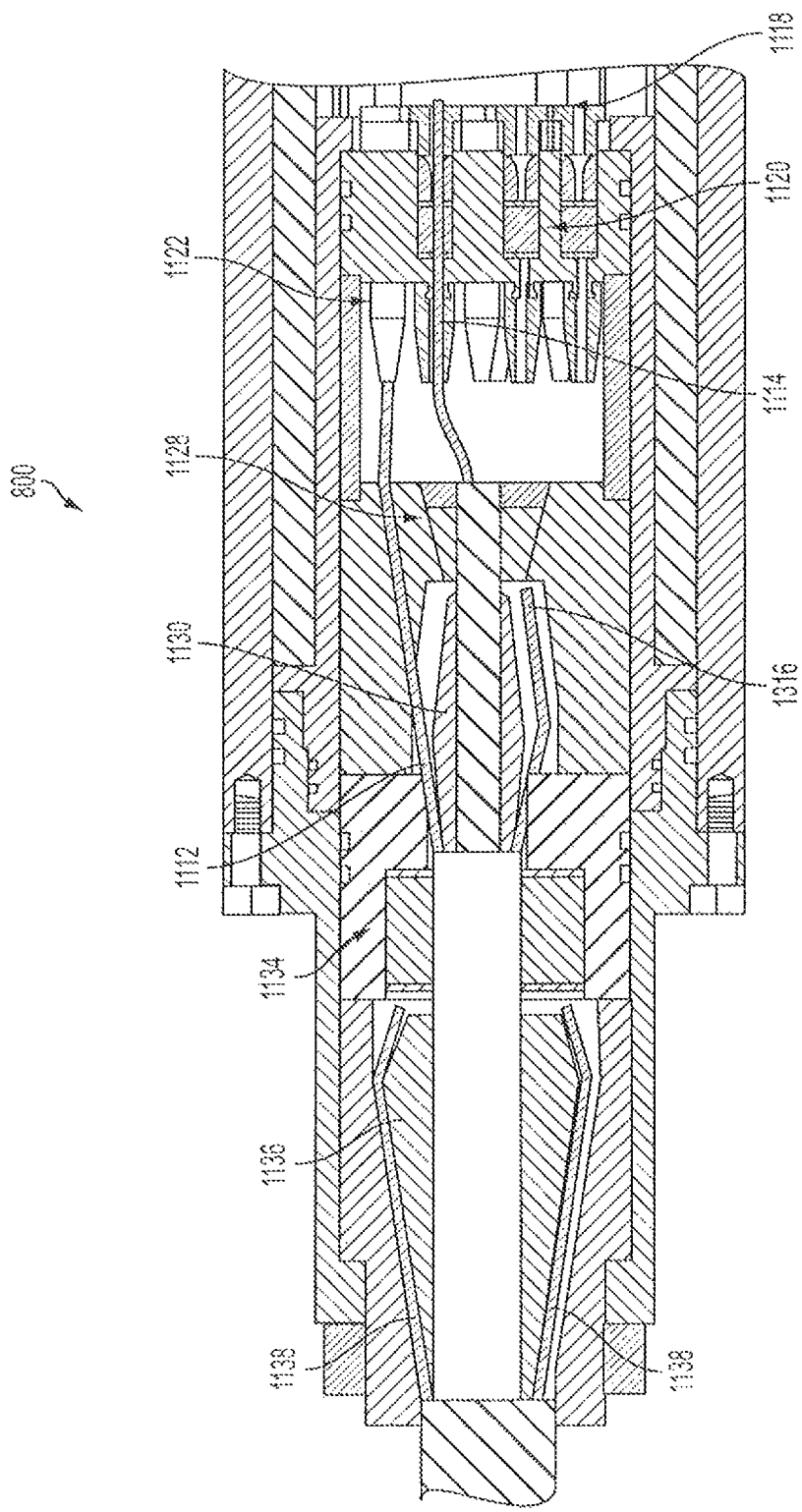
FIG. 13 is a cross section of the second exemplary embodiment of the high pressure housing in loopback configuration with additional detail provided.

FIG. 13 is a cross section of an exemplary embodiment of the high pressure housing (800) in a loopback splice configuration with additional detail provided that are common to the ANSI flange, splice, and loopback designs. FIG. 13 shows wherein the first and second outer armor wires (1138) are provided around the cable and terminate at the outer armor wedge (1136). The inner jacket seal (1134) separates the outer armor wedge (1136) and the inner armor wedge (1130). The inner armor layer of wires (1316) are terminated by the inner armor wedge (1130) and provides additional cable strength and protects the inner fiber tube layer. The first layer cable jacket grip (1128) anchors the inner most cable jacket preventing movement when the cable is tensioned. The inner fiber tubes (1114) exit the cable-end at the cable jacket grip (1128) and are guided into their respective tube seals. Both the inner layer fiber tubes (1114) and the outer layer fiber tubes (1112) are sealed by a boot seal (1122), Morrison seal (1120) and metal-to-metal swage (tube swage) (1118) before being guided into their respective circumferentially oriented cable splice trays.

Figure 14A:
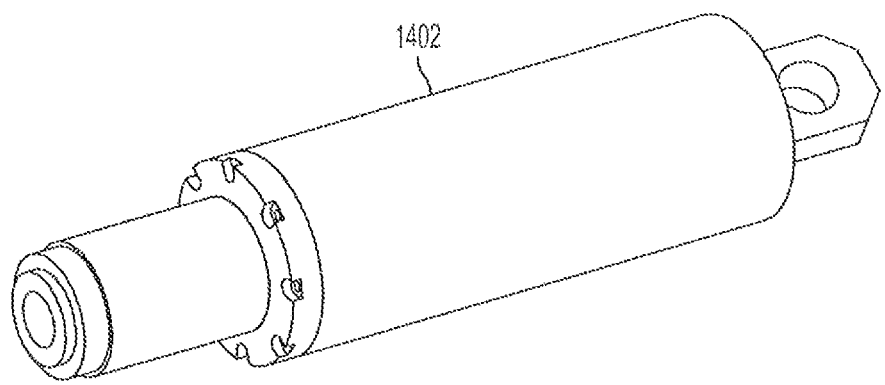
FIGS. 14A and 14B show isometric views of the second exemplary embodiment of a high pressure housing in loopback configuration.
Figure 14B:
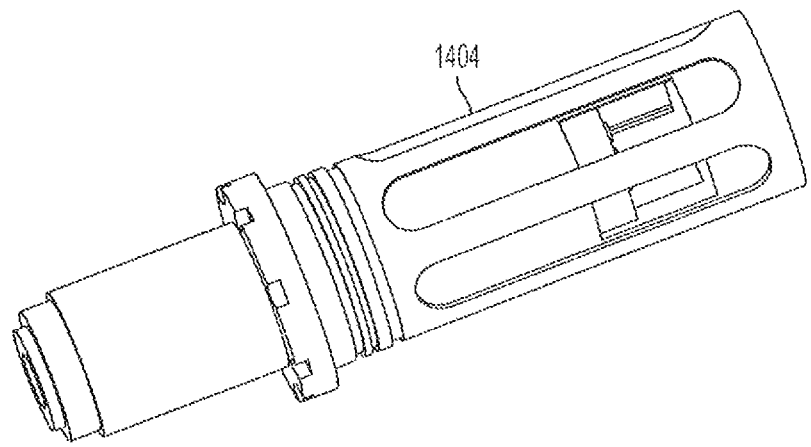

FIGS. 14A and 14B show various views of the second exemplary embodiment of the high pressure housing in a loopback splice configuration (1402). In the second exemplary embodiment of the design, the unmolded length is 560 mm, the pressure vessel length is 380 mm, the pressure vessel outer diameter is 150 mm and the weight of the housing is 40 kg. In the second exemplary embodiment, the loopback splice housing is configured wherein six circumferential splice trays are positioned radially about the inside of the housing. The circumferential splice trays have length 235 mm, width 50 mm, and depth 6 mm.

Figure 15:
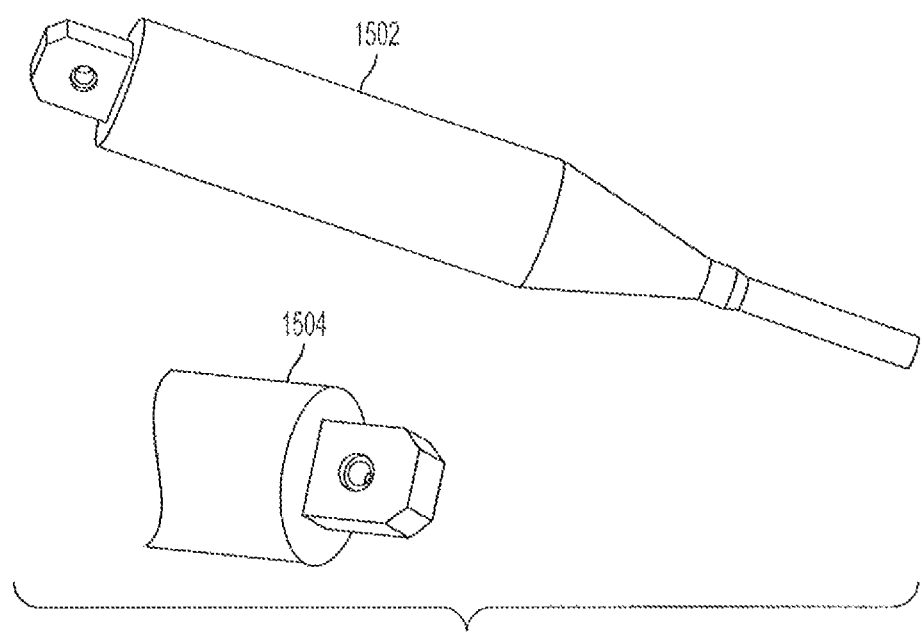
FIG. 15 shows the second exemplary embodiment of the high pressure housing in loopback configuration with overmold and overmolded corrosion isolation bushing.

FIG. 15 shows various views of the second exemplary embodiment of the high pressure housing in a loopback splice configuration shown with the termination mold (1502) with an overmolded corrosion isolating bushing (1504). In the second exemplary embodiment, the bushing has a molded length of 950 mm, a molded weight if 56 kg, a molded OD of 170 mm, a molded thickness of 10 mm and a taper angle of 15 degrees.

Advantages and benefits of the invention may include, but are not limited to, the following:

1. Novel method using series wedge anchors to achieve full cable break strength with inner armor termination representing a novel reverse helix design.

2. High splice capacity in a splice overall volume. The reference cable design has 13 tubes with 32 fibers in each tube. The circumferentially oriented splice trays have a capacity of 416 individual fiber splices. The circumferential splice trays are oriented on the outer diameter of the pressure vessel interior. This orientation provides assembly technicians with the following benefits:

A) Fiber routed from the cable terminations is protected as it is routed to the circumferentially oriented splice trays.

B) Specific tubes can be routed to specific trays to facilitate assembly.

C) All splices are visible after assembly since the splices are stored in a single layer of circumferentially oriented trays.

D) The pressure vessel form factor is smaller than most commercially available pressure housings. The overmolded length of the current invention is 1.25 meters and 17 centimeters, respectively. The current market offerings are on average 50% larger than this splice housing.

E) The high pressure housing is highly reliable. The pressure vessel interfaces are redundantly sealed. Cable layers are individually sealed. The cable termination tube seals are redundant.

F) The high pressure housing is designed for a low pressure or atmospheric pressure interior. This environment is necessary to house many fiber optic and electronic components.

G) The overall shape and size of the high pressure housing are compatible with common shipboard handling equipment and deployment equipment. As mentioned above, although the exemplary embodiments described above are various undersea housings the general inventive concept should not be limited thereto, and it could also apply to other types of housings in other high pressure environments.

What is claimed is:

1. A pressure housing apparatus comprising:
   a first cable termination shell;
   a housing connected to said first cable termination shell;
   a pressure vessel slide shell provided around said housing;
   a cable termination assembly provided within said housing; and
   an interior stand-off shell disposed between the pressure vessel slide shell and the housing, the interior stand-off shell comprising a circumferential array of slice trays and defining a circumferential array of pass-through windows, each pass-through window providing access from the cable termination assembly to one of the splice trays.

2. The pressure housing apparatus of claim 1, further comprising a second cable termination shell.

3. The pressure housing apparatus of claim 1, further comprising a flange provided on said first cable termination shell.

4. The pressure housing apparatus of claim 1, further comprising a pulling mechanism provided on said housing.

5. The pressure housing apparatus of claim 1, wherein the pressure vessel slide shell is cylindrical.

6. The pressure housing apparatus of claim 1, wherein the pressure vessel slide shell is provided with a polyurethane, polyethylene, or other polymer type overmold.

7. The pressure housing apparatus of claim 1, further comprising:
   an outer layer of fiber tubes;
   an inner layer of fiber tubes;
   an outer armored wedge positioned within the cable termination shell;
   an inner armored wedge;
   an inner jacket seal and a plurality of o-rings;
   a first layer cable jacket grip; and
   wherein the plurality of fiber tubes are guided and secured in the plurality of splice trays.

8. The pressure housing apparatus of claim 7, wherein the plurality of fiber tubes are sealed with Morrison seals.

9. The pressure housing apparatus of claim 7, wherein the plurality fiber tubes are sealed with boot seals.

10. The pressure housing apparatus of claim 7, wherein the plurality of fiber tubes are sealed with metal-to-metal swage.

11. The pressure housing apparatus of claim 7, wherein the plurality of fiber tubes are sealed by a plurality of o-rings.

12. The pressure housing apparatus of claim 7, further comprising a threaded collar provided to one end of the first cable termination shell.

13. The pressure housing apparatus of claim 7, further comprising a flooding standoff spacer.

14. The pressure housing apparatus of claim 7, further comprising a bolted flange provided on said housing and a pulling mechanism provided on said housing.

15. The pressure housing apparatus of claim 7, wherein the housing is sealed by a plurality of o-rings.

16. The pressure housing apparatus of claim 4, wherein the pulling mechanism is configured as an eyelet.

* * * * *